United States Patent
Lehaff et al.

(10) Patent No.: US 7,296,066 B2
(45) Date of Patent: Nov. 13, 2007

(54) MOBILE COMMUNICATION SYSTEM FOR A NETWORK

(75) Inventors: Samir G. Lehaff, Portola Valley, CA (US); Jens Ulrik Skakkebaek, Mountain View, CA (US)

(73) Assignee: Adomo, Inc., Cupertino, CA (US)

( * ) Notice: Subject to any disclaimer, the term of this patent is extended or adjusted under 35 U.S.C. 154(b) by 576 days.

(21) Appl. No.: 10/087,587

(22) Filed: Mar. 1, 2002

(65) Prior Publication Data
US 2002/0123331 A1 Sep. 5, 2002

Related U.S. Application Data

(60) Provisional application No. 60/273,387, filed on Mar. 4, 2001.

(51) Int. Cl.
*G06F 15/16* (2006.01)
*G06F 7/00* (2006.01)
*H04M 11/00* (2006.01)

(52) U.S. Cl. .................. 709/219; 707/10; 379/88.16
(58) Field of Classification Search ............. 370/400; 709/203, 219; 707/10; 379/88.16; 455/422.1
See application file for complete search history.

(56) References Cited

U.S. PATENT DOCUMENTS

| | | | |
|---|---|---|---|
| 5,029,199 A | 7/1991 | Jones et al. | |
| 5,568,540 A | 10/1996 | Greco et al. | |
| 5,572,578 A | 11/1996 | Lin et al. | |
| 5,703,942 A | 12/1997 | Pinard et al. | |
| 5,742,668 A | 4/1998 | Pepe et al. | |
| 5,778,390 A | 7/1998 | Nelson et al. | |
| 5,845,203 A | 12/1998 | LaDue | |
| 5,909,483 A | 6/1999 | Weare et al. | |
| 5,995,596 A | 11/1999 | Shaffer et al. | |
| 6,021,181 A | 2/2000 | Miner et al. | |
| 6,047,053 A | 4/2000 | Miner et al. | |
| 6,070,081 A | 5/2000 | Takahashi et al. | |
| 6,076,090 A | 6/2000 | Burroughs et al. | |
| 6,085,231 A | 7/2000 | Agraharam et al. | |
| 6,163,794 A | 12/2000 | Lange et al. | |
| 6,233,318 B1 | 5/2001 | Picard et al. | |
| 6,253,206 B1 | 6/2001 | Burton et al. | |

(Continued)

OTHER PUBLICATIONS

CMP Media LLC, "Adomo Launches Mobile Communications Server," Computer Telephony, Apr. 2001.

(Continued)

*Primary Examiner*—Jason Cardone
*Assistant Examiner*—Tanim Hossain
(74) *Attorney, Agent, or Firm*—Donald R. Boys; Central Coast Patent Agency, Inc.

(57) ABSTRACT

A server or software program implemented on a third-party server to facilitate incoming and outgoing calls in a mobile communication system is provided. Users can access information in a corporate information system ("CIS") through a plurality of speech terminals coupled to the server through a communications network. The information may be accessed using voice or digital signals. Conferencing with other users is also made available through the server. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

144 Claims, 4 Drawing Sheets

U.S. PATENT DOCUMENTS

| | | |
|---|---|---|
| 6,275,570 B1 | 8/2001 | Homan et al. |
| 6,304,636 B1 | 10/2001 | Goldberg et al. |
| 6,317,485 B1 | 11/2001 | Homan et al. |
| 6,324,265 B1 | 11/2001 | Christie, IV et al. |
| 6,389,276 B1 | 5/2002 | Brilla et al. |
| 6,396,908 B1 | 5/2002 | O'Donovan et al. |
| 6,405,035 B1 | 6/2002 | Singh |
| 6,411,685 B1 | 6/2002 | O'Neal |
| 6,493,431 B1 | 12/2002 | Troen-Krasnow et al. |
| 6,519,327 B1 | 2/2003 | Cannon et al. |
| 6,519,571 B1 | 2/2003 | Guheen et al. |
| 6,526,274 B1 | 2/2003 | Fickes et al. |
| 6,549,612 B2 | 4/2003 | Gifford et al. |
| 6,553,563 B2 | 4/2003 | Ambrose et al. |
| 6,618,763 B1 | 9/2003 | Steinberg |
| 6,671,800 B1 | 12/2003 | McInally et al. |
| 6,714,778 B2 | 3/2004 | Nykänen et al. |
| 6,731,927 B1 | 5/2004 | Stern et al. |
| 6,853,714 B2 | 2/2005 | Liljestrand et al. |
| 6,871,346 B1 | 3/2005 | Kumbalimutt et al. |
| 6,947,989 B2 | 9/2005 | Gullotta et al. |
| 6,950,990 B2 * | 9/2005 | Rajarajan et al. .......... 715/736 |
| 7,167,550 B2 | 1/2007 | Klos et al. |
| 2002/0032752 A1 | 3/2002 | Gold et al. |
| 2002/0049749 A1 | 4/2002 | Helgeson et al. |
| 2002/0064149 A1 * | 5/2002 | Elliott et al. ................ 370/352 |
| 2002/0115454 A1 | 8/2002 | Hardacker |
| 2002/0143877 A1 * | 10/2002 | Hackbarth et al. .......... 709/205 |
| 2002/0147801 A1 | 10/2002 | Gullotta et al. |
| 2002/0165986 A1 | 11/2002 | Tarnoff |
| 2002/0169876 A1 | 11/2002 | Curie et al. |
| 2003/0140112 A1 | 7/2003 | Ramachandran et al. |
| 2003/0195934 A1 | 10/2003 | Peterson et al. |
| 2003/0220975 A1 | 11/2003 | Malik |
| 2004/0002325 A1 | 1/2004 | Evans et al. |
| 2004/0022379 A1 | 2/2004 | Klos et al. |
| 2004/0044687 A1 | 3/2004 | Vachuska et al. |
| 2004/0049696 A1 | 3/2004 | Baker et al. |
| 2004/0062368 A1 | 4/2004 | Durkin |
| 2004/0064502 A1 | 4/2004 | Yellepeddy et al. |
| 2004/0109544 A1 | 6/2004 | Didcock et al. |
| 2004/0111702 A1 | 6/2004 | Chan |
| 2004/0120480 A1 | 6/2004 | Didcock et al. |
| 2004/0171381 A1 | 9/2004 | Inselberg |
| 2004/0225525 A1 | 11/2004 | Weitzman |
| 2004/0253956 A1 | 12/2004 | Collins |
| 2004/0258231 A1 * | 12/2004 | Elsey et al. ............. 379/201.01 |
| 2005/0025297 A1 | 2/2005 | Finnigan |
| 2005/0216421 A1 | 9/2005 | Barry et al. |
| 2006/0059107 A1 | 3/2006 | Elmore et al. |

OTHER PUBLICATIONS

Adomo AdomoMCS, undated brochure, No year found.

* cited by examiner

MOBILE COMMUNICATION SYSTEM FOR A NETWORK

CROSS-REFERENCE

This application claims the benefit of U.S. Provisional Application No. 60/273,387, filed Mar. 4, 2001, which is incorporated herein by reference in its entirety.

This application is related to copending patent application Ser. No. 10/087,713, filed Mar. 1, 2002, which is incorporated herein by reference in its entirety.

FIELD OF THE INVENTION

The present invention relates generally to a network based mobile communication system.

BACKGROUND

As electronic communications systems continue to advance, the need to tightly integrate these systems has also increased. Electronic mail (e-mail), voice mail, electronic organizers and date books, and local and wide area networks, are just a few of the communication technologies that are vital to the success of businesses and other organizations in the modern world. Many of these communication systems and services (e.g., e-mail, professional contacts, company databases and calendaring systems) are accessible only to users while at the office through a corporate infrastructure such as provided by Microsoft Exchange™. This tends to promote inefficiency because more people are conducting business while on the road or away from their offices (e.g., using wireless phones). Thus, the challenge to effectively coordinate communication among different devices (e.g., personal computers, mobile phones, Personal Digital Assistant's (PDA's), etc.) and over different communications media so that people genuinely have effective access to one another is taking on a growing importance.

Recently, the focus has been on trying to develop technology that provides users with greater functionality and access to other communications systems through their telephone. U.S. Pat. No. 6,047,053 entitled "Network based knowledge assistant" discloses a computer-implemented entity that assists a subscriber with his or her communications by carrying out tasks that are delegated to it. Although the electronic assistant can handle certain calls using a variety of different communication devices, one drawback of this type of system is it is unable to readily access corporate information systems, such as Microsoft Exchange™. In addition, it does not allow a user to perform more sophisticated communication tasks (e.g., compose e-mail messages by phone using text-to-speech recognition).

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

The present invention provides a mobile communication system and method of operation for a network. In the following description numerous specific details are set forth in order to provide a thorough understanding of the present invention. However, persons having ordinary skill in the computer arts will appreciate that many of these specific details may not be needed to practice the present invention.

Figure 1:
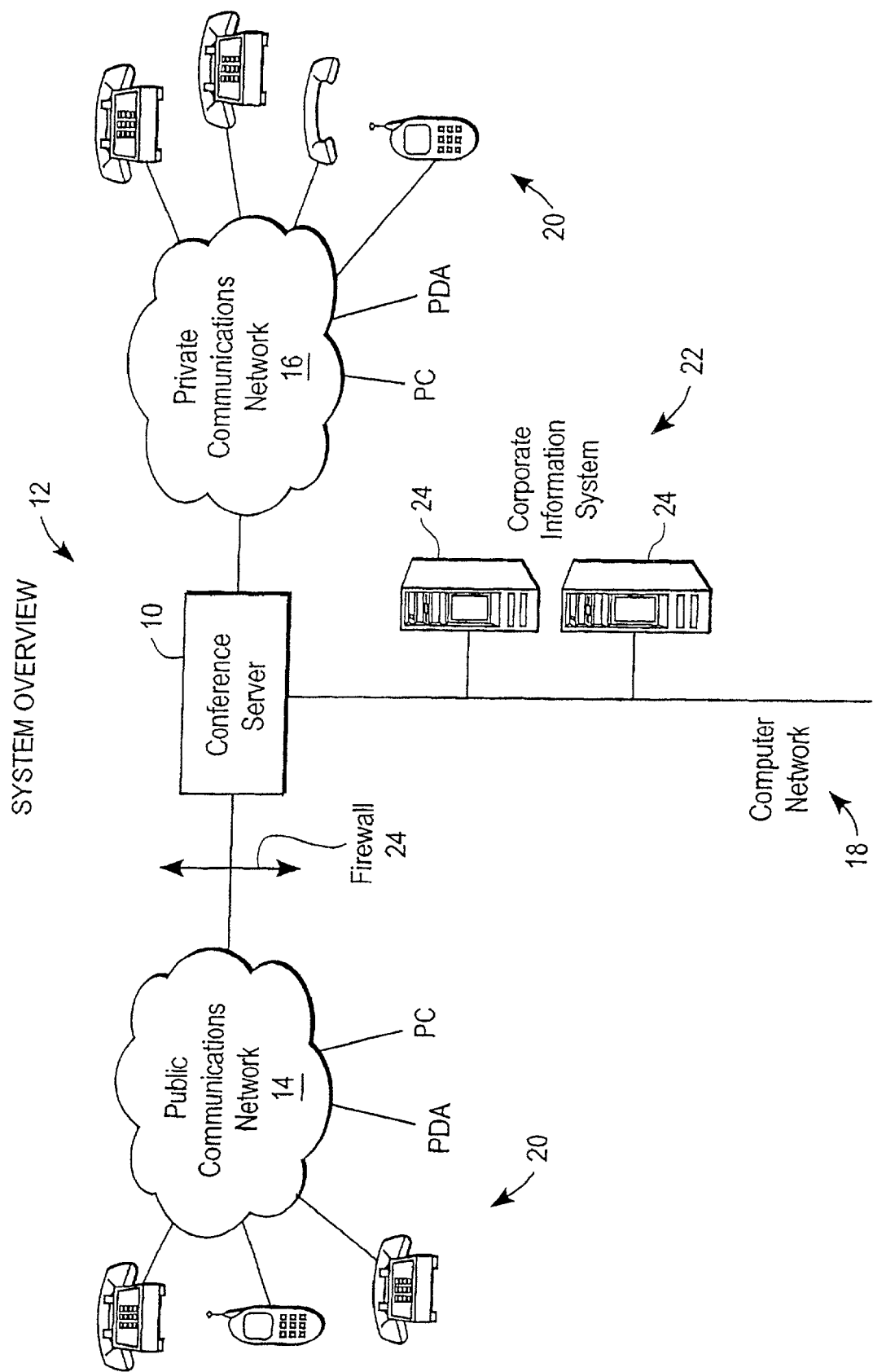
FIG. 1 is a block diagram of a communications infrastructure incorporating a mobile communication system according to one embodiment of the present invention.

As illustrated in FIG. 1, the mobile communication system 10 operates within a communications infrastructure 12. The mobile communication system 10 is a communication device with interfaces to a public communications network (public CN 14), a private communications network (private CN 16), and a computer network 18. In the embodiment illustrated by FIG. 1, a firewall 24 is used to separate the mobile communication system 10 from the public CN 14. It should be appreciated that the mobile communication system 10 may also interface with any other system of interconnections enabling two or more computers to exchange information as well (e.g., the Internet).

Mobile communication system 10 communicates with any number of speech terminals 20, (e.g., regular wired telephone and mobile phones), connected to the public CN 14 and also to any number of speech terminals 20 on the private CN 16. As those skilled in the telecommunications art will readily appreciate, the speech terminals 20 are not necessarily limited to speech. For example, the mobile communication system 10 may also communicate with any number of personal digital assistants (PDA's) 15 and personal computers 25. Since the speech terminals 20, the PDA's 15, and the personal computers 25 are electronic devices, they may incorporate circuitry to create and respond to electronic signals, such as conventional DTMF signals. It should be noted that the mobile communication system 10 also has an ability to work with speech in multiple languages (e.g., English, French, German, Italian, etc.).

The mobile communication system 10 may communicate via the computer network 18 with a corporate information system (CIS 22). The CIS 22 includes one or more corporate servers 24, such as servers for Microsoft Exchange™, Lotus Domino™, Customer Relationship Management (CRM), Field Force Automation (FFA), internal web sites, customized application servers, and database servers, such as Oracle™ servers. The servers may also continuously send information to the mobile communication system 10 via the computer network 18 and/or the Internet. Examples of continuous information include audio and video. These are labeled "corporate" here for convenience. The mobile communication system 10 may, of course, also be beneficially employed by other entities, like government agencies and non-commercial private organizations.

The mobile communication system 10 may communicate via the computer network 18 and the Internet to external servers and Internet sites. These servers and sites may be geographically located in or away from the company. These sites may include servers for Microsoft Exchange™, Lotus Domino™, Customer Relationship Management (CRM), Field Force Automation (FFA), internal websites, customized application servers, and database servers, such as Oracle™ servers. The servers may also continuously send information to the mobile communication system 10 via the computer network 18 and/or the Internet. Examples of continuous information include audio and video.

The mobile communication system 10 distributes incoming calls from the public CN 14 to the appropriate parties on a private CN 16, facilitates outbound calling from the private CN 16 to the appropriate parties on the public CN 14, and facilitates local calls between parties on the private CN 16. The conference server 10 may also facilitate calls between parties on the public CN 14 only. For instance, an employee may call into the server from his cellular or home telephone and set up a conference call, solely with outside parties.

A call is a connection between two or more users, where a user may be a person using an electrical device (e.g., a speech terminal 20) or an unattended electrical device. For example, a call may be initiated by a person using a cellular telephone but received by an unattended voice mail system.

The public CN 14, the private CN 16, and the computer network 18 may all be distributed among multiple geographic locations.

The mobile communication system 10 is configured to allow one party to access another party using their name or some other form of identification. In one embodiment, the mobile communication system 10 dynamically associates a user with (at least one) particular speech terminal 20. To facilitate this feature, the concept of a login is employed. The association between a user and a speech terminal 20, PDA 15, or personal computer 25 is created when the user logs into the mobile communication system 10 from the speech terminal 20. The association between a user name and a particular speech terminal 20 is stored together with a user profile in the corporate information system (CIS 22). The CIS 22 stores this association until the user either logs out or logs in on another speech terminal 20. The association may be stored in memory, in a register, a latch, etc.

If a user moves to another location, the user is able to log in at any speech terminal 20 at the new location. This causes the mobile communication system 10 to change the association between the user name and a speech terminal 20 and to store this new association in the CIS 22.

Once the user is logged in, the mobile communication system 10 may recall the association between the user and speech terminal 20, so that the next time the user uses the same speech terminal 20, the mobile communication system 10 will have this association available. The mobile communication system 10 may use this association until a logout or a login on another speech terminal 20. However, the mobile communication system 10 will not necessarily allow access to sensitive data this way. In cases involving sensitive data, the mobile communication system 10 may require a login.

Independent of whether or not a user is logged in (if at all) to a speech terminal 20, the mobile communication system 10 may still allow any user to dial out from the speech terminal 20, using the publicly available directory information or by providing the mobile communication system 10 with one or more outside phone numbers.

To handle the necessary user data for all of this, the mobile communication system 10 is able to access all the information that is stored in the CIS 22, including contact information, address information, e-mails, calendar and task lists. This may be quite a considerable amount of data and data that is particularly powerful. For an example one need only contemplate the range of data already commonly stored in systems like Microsoft Exchange™. Traditionally, reaching a party has required knowing their telephone number, extension, etc. Now, using speech or keystrokes, a user's actual number, system user name, e-mail address, instant messaging identifier, phone number, extensions, etc., may all be used. Any manner by which the user is "known" or may be known to the CIS 22 is searchable.

Particular user information for use with the mobile communication system 10 may include password or PIN-codes, user preferences, alternate login-names, associations between users and speech terminals 20. These are stored together with a user profile on the CIS 22. For instance, using Microsoft Exchange™ this information is stored as "custom attributes." Other mechanisms, in Microsoft Exchange™ or in entire other frameworks, like Lotus Domino™, may also be used.

The mobile communication system 10 may use all parties that are defined in the CIS 22 as addressable parties. Typically, these are people/individuals, resources, and groups. The people or individuals are users of the system, as well as contact information on outside parties. The resources may include, for instance, meeting rooms, cars, office equipment, etc. And the groups are groupings of people and resources, (e.g., "marketing" or "sales").

The mobile communication system 10 has the ability to provide a so-called multi-modal interface, where the user can interact with the mobile communication system 10 through any form of input and output, such as text input, speech recognition, text output, text-to-speech, graphics, recorded files and video. In such interfaces, the speech recognition and text-to-speech generation may partly take place in the speech terminal 20 and partly in the mobile communication system 10. For example, sound and/or video may be generated by the mobile communication system 10 by a continuous stream of sound and/or video data sent to the speech terminal 20. Such divided speech recognition is referred to as distributed speech recognition and is well known in the communication arts.

User-interaction with the mobile communication system 10 is particularly empowered. A user may command an attendant using spoken commands and keystrokes. For handling spoken commands the mobile communication system 10 incorporates speech recognition technology to interpret spoken commands, phrases, and sentences from the users. For handling keystroke commands the mobile communication system 10 interprets keystrokes from electronic devices in a conventional manner. For example, a user may call and request to have an e-mail read back to him from the CIS 22. The user may then request the mobile communication system 10 to respond to the e-mail message with a phone call. The mobile communication system 10 has the ability to search the CIS 22 for the correct phone number and make the call. In another example of user-interaction with the mobile communication system 10, a user can call the system and have the system update the user's calendar in the CIS 22. By way of example, the user can provide a voice command to the system using their office phone such as "I'll be out for lunch until 2:00 p.m." or "I've gone to a doctor's appointment, I'll be back by 3:00 p.m." The mobile communication system responds to the voice command by automatically updating the user's calendar in the CIS 22. When another person then calls for the user, the mobile communication system will automatically take a message, forward the call, send an e-mail message to the user regarding the phone call, or take other appropriate action.

The set of spoken commands and keystrokes that are accepted by the mobile communication system 10 may also change dynamically while a user is using the system, depending on what the users are doing and what their current needs and options may be. The user may specify, for example, directly as an explicit preference or implicitly by the nature of the speech terminal 20 currently being used, that a terse or verbose command mode be adopted. The mobile communication system 10 may also respond to the user by playing pre-recorded sound recordings or by on-the-fly translating of responses into sounds using text-to-speech technology. This may also be highly configurable or adaptive. For instance, the mobile communication system 10 may employ different "personalities" and it may also operate differently based on the nature of the speech terminal 20 currently being used by a particular user.

Figure 2A:
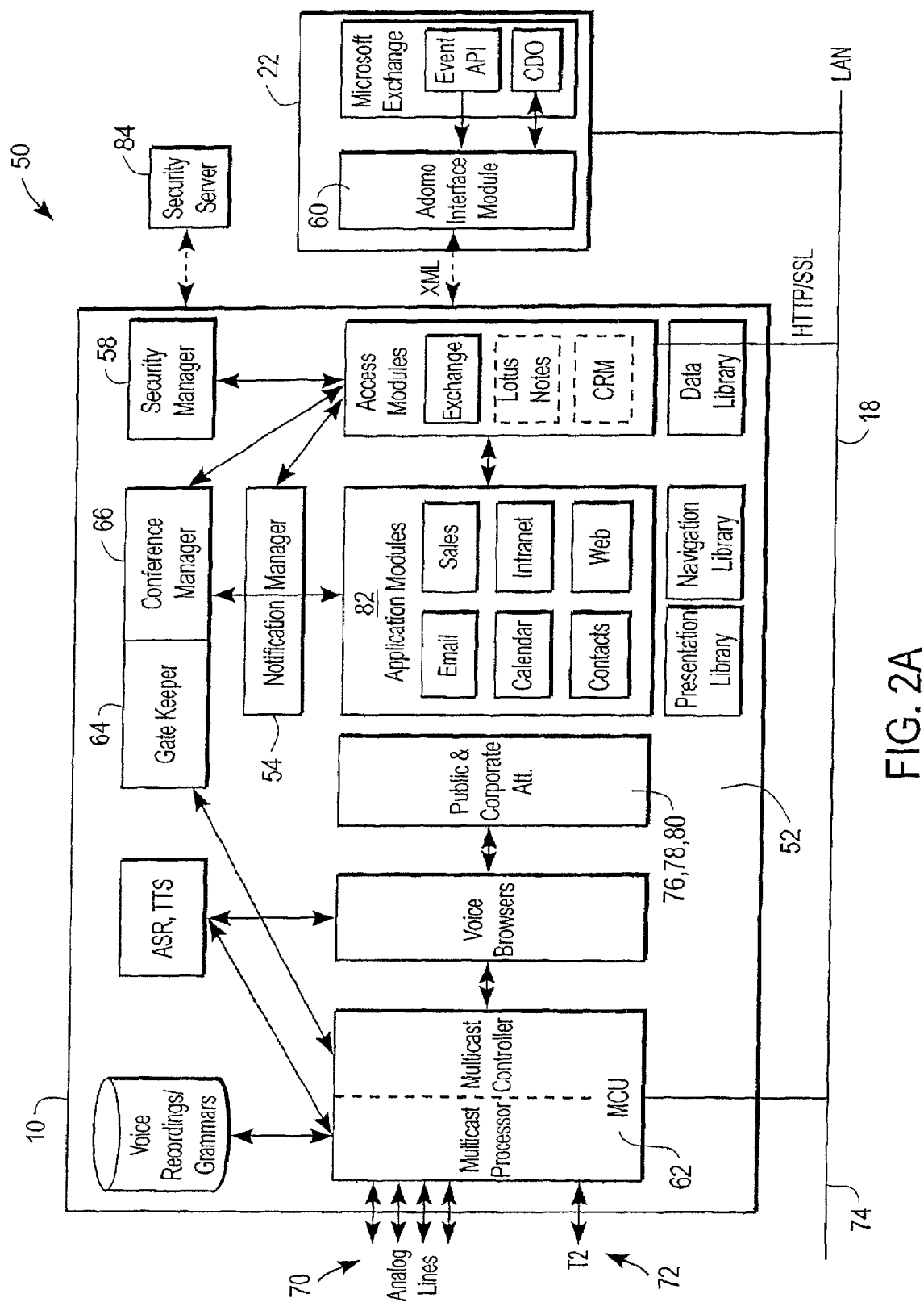
FIG. 2A is a block diagram of the system architecture of a mobile communication system according to one embodiment of the present invention.

As is shown in FIG. 2A, each incoming and outgoing call is handled by an attendant 76. There are two types of attendants, a public attendant 78 and a corporate attendant 80. The public attendant 78 handles incoming calls from users external to the corporation or other entity using the mobile communication system 10. This allows an external user to ask to be connected to any user that is registered in the CIS 22, and also to access a limited amount of information about the corporation.

In the first case, the mobile communication system 10 first requests the caller's identity and then attempts to locate the party being called. If the party is found, the connection is set up. If the party is not reached, the mobile communication system 10 asks the outside user to record a message. The mobile communication system 10 can store the message as a voice mail is easily done or translate the message and send it as an e-mail, Instant Message, or other message type, via the CIS 22.

The corporate attendant 80 gives particular employees of the corporation access to all people and all the information that is in the CIS 22, subject, if desired, to various security level permissions. The mobile communication system 10 prompts the user for their user name and passcode or PIN-code and then gives the user access to conferencing with all parties registered in the system, or access to all the information in the CIS 22 that the user normally has permission to access via other means.

The information in the CIS 22 that a logged in user may access includes, but is not limited to, e-mails, calendars, directory listings, personal contacts, corporate information (e.g., news, employee plans, sales force information, etc.), content from the Internet, customer relationship management information, etc.

A conference is initiated by a user or may be initiated by the mobile communication system 10. The mobile communication system 10 may, using the information in the CIS 22, determine which of the users may be reached and where they may be reached. The mobile communication system 10 thereafter connects to the users and the conference is set up. All users in the conference may then communicate among themselves and also access the information in the CIS 22 during the conference.

New users may be added to an active conference session, by asking the mobile communication system 10 to conference in the user. Parties that were not reached in the initial set up for them may be notified and provided a conference ID. They are able to join the conference using this conference ID.

Parties may also be reached as members of ring groups and hunt groups. Ring groups are groups in the CIS 22. Hunt groups are also groups in the CIS 22, but with some added information on the order in which the members are to be contacted. This information is also stored in the CIS 22.

New conferences may also be initiated from other functions in the mobile communication system 10, such as while reading e-mails and looking at calendar entries. The mobile communication system 10 knows who the e-mail is from and who are the participants in a meeting, and the user can with a single command make the mobile communication system 10 call the sender or participants.

The mobile communication system 10 furthermore supports parking of conferences, transfer of conferences, day and night modes, and background music. For instance, the background music may be retrieved from the CIS 22 and played by the mobile communication system 10.

All messages recorded in the mobile communication system 10 are transferred to the CIS 22 and stored there. The messages may be attached to other parties in the CIS 22, such as e-mails and calendar entries.

The mobile communication system 10 monitors the information in the CIS 22 and is able to notify a user when certain changes happen or when a time exceeds some predefined time bounds. Examples of such state changes include incoming e-mails, incoming meeting requests, and rescheduling of meetings.

The mobile communication system 10 supports security measures such as PIN-codes, encrypted connection between the mobile communication system 10 and the CIS 22, speaker authentication based on user voice characteristics, and, generally, the whole spectrum of existing authentication servers used today, including authentication servers supporting dynamically changing PIN-codes.

From a user's perspective, they can simply access the mobile communication system 10 from any speech terminal 20. To make a call from the private CN 16 the user picks up a telephone handset, and the attendant 76 can identify itself immediately. The user can then place conference calls or access information in the CIS 22.

The attendant 76 is available at all times when the user is connected to the mobile communication system 10, and also during conference calls. The attendant 76 is thus able to act as a personal assistant, assisting the user with information access, setting up new conferences, and recording the conferences for later distribution. The attendant 76 can also be available to the leader of the conference only, or to all users of a conference. The user interface of the mobile communication system 10 is able to adapt to the user, such that the amount and kind of information passed to the user varies.

From a system administration perspective, no user specific information is necessarily stored in the mobile communication system 10. The mobile communication system 10 may, however, cache information from the CIS 22 to optimize performance. This provides the mobile communication system 10 with a number of benefits. Since it need not rely on user information databases of its own, there are no problems related to updating such. Similarly, a high degree of scalability is possible and is simplified because there are no problems or overhead associated with synchronizing user information databases among multiple mobile communication systems 10. Yet further, the security measures of the underlying CIS 22 may be relied on and not compromised. Still further, mechanisms for working with the user information will be present in the CIS 22 and will, presumably, already be known. Thus training is easy and operation is highly consistent. In sum, the underlying user information, and the solutions to the vexing problems of maintaining it, are already present in the CIS 22 and need not be duplicated.

A typical installation of the mobile communication system 10 is done in steps. First, certain network information is stored in the mobile communication system 10 by connecting to it from a speech terminal 20 and configuring it with the help of the attendant 76. Second, a software component is installed on the CIS 22 and the CIS 22 is configured to use that software component. This may include configuring accounts, changing permissions, and storing configuration information specific to the mobile communication system 10. Finally, the users are enabled in the mobile communication system 10.

Figure 2B:
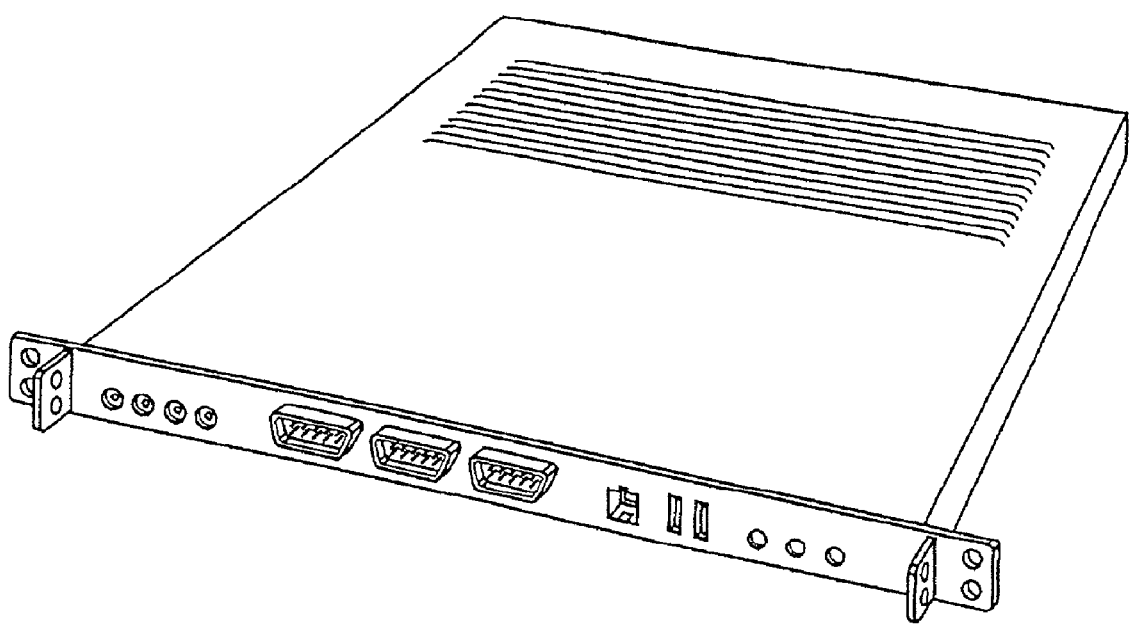
FIG. 2B is an illustration of the self-contained, "pizza-box" style server of a mobile communication system according to one embodiment of the present invention.

As touched upon above, the inventive mobile communication system 10 is highly scalable. The mobile communication system 10 is essentially an "appliance" because the system is self-contained. It may be encased in a stackable, "pizza-box" style server 90 (FIG. 2B). Since all information may be stored in the CIS 22, multiple mobile communication systems 10 can run against the same CIS 22. This provides easy scalability, since an organization can add more mobile communication systems to expand capacity to meet increased demand.

The mobile communication system 10 may also serve multiple geographic locations. Multiple mobile communication systems 10 may be connected to the same private CN 16. In this configuration, a user can access the information in a CIS 22 from a mobile communication system 10 in a remote geographical location. The mobile communication system 10 relies on the directory information and mechanisms in the CIS 22 to forward the requests from the mobile communication system to the current repository.

All maintenance, including system status information of the mobile communication system 10 and upgrading can be performed from a computer anywhere on the computer network 18. Since all user-related information is stored with the user profile in the CIS 22, it is easy to move information from one corporate sever 24 in the CIS 22 to another.

Referring now to FIG. 2A there is shown a block diagram of the system architecture of a mobile communication system according to one embodiment of the present invention. The architecture 50 is modular and components may be swapped in and out, giving the flexibility to create several different configurations adapted to address different needs.

The main software components reside in the mobile communication system 10 and the CIS 22. In the mobile communication system 10, there is a dialogue engine 52, a notification manager 54, backend data access modules 56, and a security manager 58. In the CIS 22, one or more interface modules 60 are provided. In the embodiment illustrated by FIG. 2A, the first interface module 60 developed is for Microsoft Exchange™. Modules for other servers may be used as well, such as Lotus Domino™.

The mobile communication system 10 provides part of the telephony functionality and includes a multicast control unit (MCU 62), a gate keeper 64, and a conference manager 66. The MCU 62 performs multicast switching inside kernal software 68, (e.g., Linux™), running on a standard hardware platform with one or more CPUs. This may be performed via telephone line-cards, represented here by analog lines 70 and a T1 line 72, and a local area network (LAN 74) which is, in turn, part of the computer network 18.

In the exemplary embodiment, the conference manager 66 holds the intelligence for locating people (office, home, cell, etc.) using information from Exchange (our example) in the CIS 22. It also sets up conferences using Exchange groups, and manages these as they progress. Conferences may also be scheduled as a conference in the Exchange calendar; in this case, the conference manager 66 is notified when it is time for the conference and it initiates the conference.

The dialogue engine 52 generates the speech dialogue at run-time, based on all the information that is available, (e.g., the user's profile, the calendar, meeting requests, and time of day). The user-interface adapts to the user, based on their preferences and how fast they respond. Combined with the use of data caching techniques, such as pre-fetching of the next e-mail, this provides a very rapid response in the user interface.

The dialogue is generated by an attendant 76 (a module which includes both the public attendant 78 and the corporate attendant 80) and a number of application modules 82, (e.g., for e-mail, calendar, contacts, web, and intranet). Different products may contain a different subset of the modules, as particular needs and options dictate. More flexibility can be added, if needs change.

As noted, on the embodiment illustrated by FIG. 2A, two kinds of sub-attendant functionality are provided: the public attendant 78 and the corporate attendant 80. The former greets outside users and connects them to people inside the company, and the latter allows employees to access their corporate information (Exchange, CRM, etc.).

The notification manager 54 monitors the state of the backend information systems and initiates an action when certain events happen. Examples of events include the start of scheduled meetings, canceling of meetings, arrival of new e-mails, incoming calls and news flashes from the corporate intranet, etc. A user may request that the mobile communication system 10 places a call to the user, when such events occur. The mobile communication system 10 can also pro-actively assist customers. For example, if a user is in a meeting and a subsequent meeting is cancelled a voice mail message may be sent to the user's cell phone. Or a user may instruct the system that any e-mails from their supervisor or a key client are to be translated and sent as voice mail messages.

The backend access modules 56 pass requests from the dialogue engine 52 to the backend systems (e.g., Exchange in the CIS 22). New access modules may be added into the framework as new backend systems may be added (e.g., Lotus Domino™ and CRM).

The security manager 58 handles initial configuration of the mobile communication system 10, so that a secure connection is immediately established between the mobile communication system 10 and the backend corporate servers 24. Furthermore, it allows the mobile communication system 10 to connect to existing authentication servers in the corporate infrastructure, such as the security server 84 shown in FIG. 2A. The security manager 58 does not, however, have to remain active beyond initial configuration. As discussed above, once integrated into the system architecture 50, the mobile communication system 10 may or may not rely on the CIS 22 for general security needs.

To connect to the corporate information repositories on the corporate servers 24 in the CIS 22, the interface modules 60 are installed in the CIS 22. In one embodiment, interface module 60 is adapted for the widely used Microsoft Exchange™ product. The interface module 60 is a thin conversion layer that passes on requests from the mobile communication system 10 to Exchange and returns data in XML format. Furthermore, it registers with Exchange for certain events (e.g., arrival of urgent meeting requests) and forwards these to the notification manager 54.

It should be noted that the system described herein may also be implemented in software such as Java, Perl, C++ or other types of software programming languages and can be stored in a computer readable medium (e.g., a disk). This would be an embodiment of the invention as a software solution executing on a third-party server.

Figure 3:
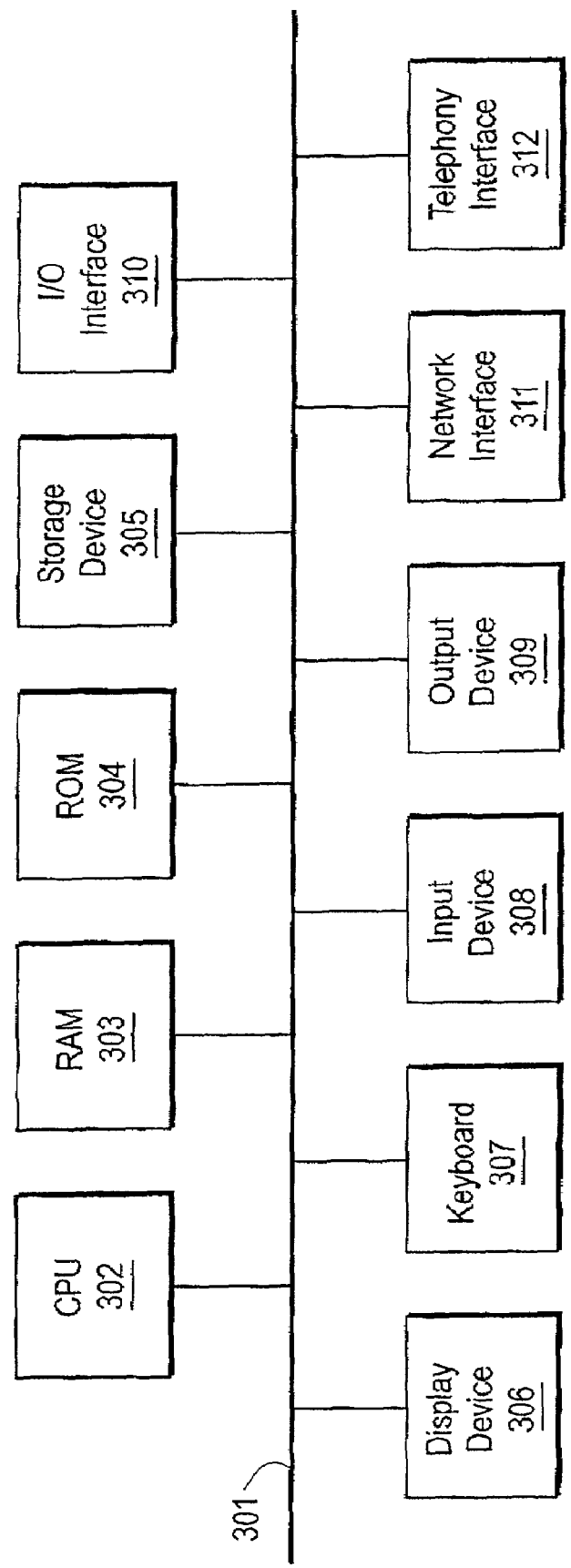
FIG. 3 illustrates an example of a computer system that implements one embodiment of the present invention.

Referring now to FIG. 3 there is shown an example of a computer system on which the present techniques may be implemented according to one embodiment of the present invention. The computer system 300 includes a processor 302 coupled through a bus 301 to a random access memory (RAM) 303, a read only memory (ROM) 304, and a mass storage device 305. Mass storage device 305 could be a disk or tape drive for storing data and instructions. A display device 306 for providing visual output is also coupled to processor 302 through bus 301. Keyboard 307 is coupled to bus 301 for communicating information and command selections to processor 302. Another type of user input device is cursor control unit 308, which may be a device such as a mouse or trackball, for communicating direction commands that control cursor movement on display 309. Many other input devices well known in the art may also be used. Further coupled to processor 302 through bus 301 is an input/output (I/O) interface 310 which can be used to control and transfer data to electronic devices connected to computer 300, such as other computers, tape records, and the like. The processor 302 may also be connected to a telephony interface 312 through bus 301. It should be noted that although display device 306, keyboard 307, and cursor control unit 308 may be included in the computer system 300, they are typically not essential for the computer system 300 to operate after the software has been installed.

Network interface device 311 is coupled to bus 301 and provides a physical and logical connection between computer system 300 and the network medium (not shown in this view). Depending on the network environment in which computer 300 is used, this connection is typically to a server computer, but it can also be to a network router to another client computer. Note that the architecture of FIG. 3 is provided only for purposes of illustration, and a client computer used in conjunction with the present invention is not limited to this specific architecture.

In the foregoing, a mobile communication system has been described. Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed:

1. A mobile communication system, comprising:
   a communication server, the communication server including,
      an interface to a telecommunications network for speech communication;
      logic that handles calls;
      logic that asks a caller to record a voice message; and
      logic that accesses a corporate information system (CIS);
   the CIS, coupled to the communication server through a network, the CIS including
      storage for corporate information including emails, and servers including an email server;
   an interface module that communicates between the CIS and the communication server through the logic on the communication server that accesses the CIS;
   logic that stores, in the CIS, user profiles with all user-related information of the communication server;
   logic that caches the user-related information from the CIS on the communication server;
   logic that performs administration on the user-related information on the user related information stored on the CIS; and
   a plurality of speech terminals coupled to the communications server through the telecommunications network, the speech terminals accessing data in the CIS through voice or other signals.

2. The mobile communication system of claim 1 wherein the voice signals are recognized through speech recognition technology.

3. The mobile communication system of claim 1 wherein the server is a modular appliance.

4. The mobile communication system of claim 1 wherein the telecommunications network includes a public communications network and a private communications network.

5. The mobile communication system of claim 4 wherein the server is configured to distribute incoming calls from the public communications network to the private communications network.

6. The mobile communication system of claim 4 wherein the server is configured to distribute outgoing calls from the private communications network to the public communications network.

7. The mobile communication system of claim 4 wherein the server is configured to distribute incoming and outgoing calls to the private communications network.

8. The mobile communication system of claim 4 wherein the server is configured to distribute incoming and outgoing calls to the public communications network.

9. The mobile communication system of claim 1 wherein the speech terminals are attended devices.

10. The mobile communication system of claim 1 wherein the speech terminals are unattended devices.

11. The mobile communication system of claim 1 wherein a user accesses one or more parties through a speech terminal using the e-mail address, phone number, or any other form of identification for the one or more parties stored in the CIS.

12. The mobile communication system of claim 1 wherein the server dynamically associates a user with a speech terminal using data stored in the CIS, the association created when the user logs on to the mobile communication system with a speech terminal.

13. The mobile communication system of claim 12 wherein the CIS stores the association between the user and the speech terminal as a user profile, the CIS accessing the user profile every time the user logs on to the mobile communication system using the speech terminal.

14. The mobile communication system of claim 1 wherein user authentication is required to access the data in the CIS.

15. The mobile communication system of claim 14 wherein the authentication comprises a code.

16. The mobile communication system of claim 14 wherein the authentication comprises a matching voice characteristic.

17. The mobile communication system of claim 1 wherein the data in the CIS includes contact information.

18. The mobile communication system of claim 1 wherein the data in the CIS includes e-mail messages.

19. The mobile communication system of claim 1 wherein the data in the CIS includes address information.

20. The mobile communication system of claim 1 wherein the data in the CIS includes calendar and task lists.

21. The mobile communication system of claim 1 wherein the data in the CIS includes directory lists.

22. The mobile communication system of claim 1 wherein the data in the CIS includes customer relationship management information.

23. The mobile communication system of claim 1 wherein the data in the CIS includes sales force automation information.

24. The mobile communication system of claim 1 wherein the data in the CIS includes field force automation information.

25. The mobile communication system of claim 1 wherein the data in the CIS includes information related to an organization's employees.

26. The mobile communication system of claim 25 wherein the data in the CIS includes information from data repositories internal to the organization.

27. The mobile communication system of claim 25 wherein the data in the CIS includes information from data repositories external to the organization.

28. The mobile communication system of claim 1 wherein the data in the CIS includes information from databases and web sites on the Internet.

29. The mobile communication system of claim 1 wherein the speech terminals are configured to allow a user to access and update the data in the CIS though the speech terminals.

30. The mobile communication system of claim 29 wherein the data in the CIS is accessible to the user and to other users registered in the CIS.

31. The mobile communication system of claim 1 wherein the server is configured to allow a user to perform tasks using the CIS.

32. The mobile communication system of claim 31 wherein the tasks include sending and receiving messages.

33. The mobile communication system of claim 32 wherein the messages are e-mail messages.

34. The mobile communication system of claim 31 wherein the tasks include forwarding calls.

35. The mobile communication system of claim 31 wherein the tasks include conferencing with other parties registered in the CIS.

36. The mobile communication system of claim 1 wherein a set of responses to a user changes dynamically depending on the needs of the user.

37. The mobile communication system of claim 36 wherein the set of responses to the user includes a recorded message.

38. The mobile communication system of claim 36 wherein the set of responses to the user is an on-the-fly translation of responses into sounds using text-to-speech technology.

39. The mobile communication system of claim 1 wherein the speech terminals include multi-modal interfaces.

40. The mobile communication system of claim 38 wherein the user can input information to the server through the multi-modal interfaces using text, keystrokes, and speech recognition.

41. The mobile communication system of claim 38 wherein the multi-modal interfaces present information to the server using a combination of sound, text, graphics, and video.

42. The mobile communication system of claim 41 wherein the sound is generated by text-to-speech technology.

43. The mobile communication system of claim 41 wherein the sound is generated by playing recorded files.

44. The mobile communication system of claim 41 wherein the sound is generated by a continuous stream of sound data sent to the multi-modal interfaces.

45. The mobile communication system of claim 41 wherein the video is generated by a continuous stream of video data sent to the multi-modal interfaces.

46. The mobile communication system of claim 1 wherein the speech terminals include telephones.

47. The mobile communication system of claim 1 wherein the speech terminals include personal digital assistants.

48. The mobile communication system of claim 1 wherein the speech terminals include computers.

49. A server for a mobile communications network having speech terminals, the server comprising:
    means for interfacing to a telecommunications network for speech communication;
    means for handling calls;
    means for asking a caller to record a voice message;
    means for accessing a corporate information system (CIS);
    means for receiving and caching, from the CIS, user-related information of the server, all of which is stored on the CIS and for which administration is performed on the CIS, wherein the CIS includes storage for corporate information including emails, and servers including an email server;
    means for distributing incoming and outgoing calls from the speech terminals; and
    means for accessing data in the CIS through voice or other signals received from the speech terminals through the telecommunications network.

50. The mobile communication system of claim 49 wherein the voice signals are recognized through speech recognition technology.

51. The server of claim 49 wherein the server functions as a modular appliance.

52. The server of claim 49 wherein the telecommunications network includes a public communications network and a private communications network.

53. The server of claim 52 further comprising means to distribute incoming calls from the public communications network to the private communications network.

54. The server of claim 52 further comprising means to distribute outgoing calls from the private communications network to the public communications network.

55. The server of claim 52 further comprising means to distribute incoming and outgoing calls to the private communications network.

56. The server of claim 52 further comprising means to distribute incoming and outgoing calls to the public communications network.

57. The server of claim 49 wherein the speech terminals are attended devices.

58. The server of claim 49 wherein the speech terminals are unattended devices.

59. The server of claim 49 further comprising means for allowing a user to access one or more parties through a speech terminal using the e-mail address, phone number, or any other form of identification for the one or more parties stored in the CIS.

60. The server of claim 49 further comprising means for dynamically associating a user with a speech terminal using data stored in the CIS, the association created when the user logs on to the server with a speech terminal.

61. The server of claim 60 wherein the CIS stores the association between the user and the speech terminal as a user profile, the CIS accessing the user profile every time the user logs on to the server using the speech terminal.

62. The server of claim 49 further comprising means for requiring user authentication to access the data in the CIS.

63. The server of claim 62 wherein the authentication comprises a code.

64. The server of claim 62 wherein the authentication comprises a matching voice characteristic.

65. The server of claim 49 wherein the data in the CIS includes contact information.

66. The server of claim 49 wherein the data in the CIS includes e-mail messages.

67. The server of claim 49 wherein the data in the CIS includes address information.

68. The server of claim 49 wherein the data in the CIS includes calendar and task lists.

69. The server of claim 49 wherein the data in the CIS includes directory lists.

70. The server of claim 49 wherein the data in the CIS includes customer relationship management information.

71. The server of claim 49 wherein the data includes sales force automation.

72. The server of claim 49 wherein the data includes field force automation.

73. The server of claim 49 wherein the data in the CIS includes information related to an organization's employees.

74. The server of claim 49 wherein the data in the CIS includes information from data repositories internal to the organization.

75. The server of claim 49 wherein the data in the CIS includes information from data repositories external to the organization.

76. The server of claim 49 wherein the data in the CIS includes information from databases and web sites on the Internet.

77. The server of claim 49 wherein the speech terminals are configured to allow a user to access and update the data in the CIS through a speech terminal.

78. The server of claim 77 wherein the data is accessible to the user and to other users registered in the CIS.

79. The server of claim 49 further comprising means to allow a user to perform tasks using the CIS.

80. The server of claim 79 wherein the tasks include sending and receiving messages.

81. The server of claim 79 wherein the messages are e-mail messages.

82. The server of claim 79 wherein the tasks include forwarding calls.

83. The server of claim 79 wherein the tasks include conferencing with other parties registered in the CIS.

84. The server of claim 49 further comprising means for allowing a set of responses to a user to change dynamically depending on the needs of the user.

85. The server of claim 84 wherein the set of responses to the user includes a recorded message.

86. The server of claim 84 wherein the set of responses to the user is an on-the-fly translation of responses into sounds using text-to-speech technology.

87. The server of claim 49 wherein the speech terminals include multi-modal interfaces.

88. The server of claim 87 wherein the user can input information to the server through the multi-modal interfaces using text, keystrokes, and speech recognition.

89. The server of claim 87 wherein the multi-modal interfaces present information to the server using a combination of sound, text, graphics, and video.

90. The server of claim 89 wherein the sound is generated by text-to-speech technology.

91. The server of claim 89 wherein the sound is generated by playing recorded files.

92. The server of claim 89 wherein the sound is generated by a continuous stream of sound data sent to the multi-modal interfaces.

93. The server of claim 89 wherein the video is generated by a continuous stream of video data sent to the multi-modal interfaces.

94. The server of claim 49 wherein the speech terminals include telephones.

95. The server of claim 49 wherein the speech terminals include personal digital assistants.

96. The server of claim 49 wherein the speech terminals include computers.

97. A computer program product including a computer useable medium comprising:
   first computer-readable code for running on a computer, the first computer-readable code for interfacing to a telecommunications network for speech communication;
   second computer-readable code for running on the computer, the second computer readable code for receiving and caching, from a corporate information system ("CIS"), user-related information of the computer which is stored on the CIS and for which administration is performed on the CIS, wherein the CIS includes storage for corporate information including emails, and servers including an email server;
   third computer-readable code for running on the computer, the third computer-readable code distributing incoming and outgoing calls from the speech terminals; and
   fourth computer-readable code for running on the computer, the fourth computer-readable code handling calls;
   fifth computer-readable code for running on the computer, the fifth computer-readable code asking a caller to record a voice message; and
   sixth computer-readable code for running on the computer, the sixth computer-readable code for accessing data in the CIS through voice or digital signals received from the speech terminals through the mobile communications network, the voice signals recognized by speech recognition technology.

98. The computer program product of claim 97 wherein the computer is a server configured as a modular appliance.

99. The machine readable storage medium of claim 97 wherein the telecommunications network includes a public communications network and a private communications network.

100. The computer program product of claim 98 wherein the server is configured to distribute incoming calls from the public communications network to the private communications network.

101. The computer program product of claim 98 wherein the server is configured to distribute outgoing calls from the private communications network to the public communications network.

102. The computer program product of claim 98 wherein the server is configured to distribute incoming and outgoing calls to the private communications network.

103. The computer program product of claim 98 wherein the server is configured to distribute incoming and outgoing calls to the public communications network.

104. The computer program product of claim 98 wherein the speech terminals are attended devices.

105. The computer program product of claim 98 wherein the speech terminals are unattended devices.

106. The computer program product of claim 98 wherein a user accesses one or more parties through a speech terminal using the e-mail address, phone number, or any other form of identification for the one or more parties stored in the CIS.

107. The computer program product of claim 98 wherein the server dynamically associates a user with a speech terminal using data stored in the CIS, the association created when the user logs on to the mobile communication system with a speech terminal.

108. The computer program product of claim 107 wherein the CIS stores the association between the user and the speech terminal as a user profile, the CIS accessing the user profile every time the user logs on to the mobile communication system using the speech terminal.

109. The computer program product of claim 98 wherein user authentication is required to access the data in the CIS.

110. The computer program product of claim 109 wherein the authentication comprises a code.

111. The computer program product of claim 109 wherein the authentication comprises a matching voice characteristic.

112. The computer program product of claim 98 wherein the data in the CIS includes contact information.

113. The computer program product of claim 98 wherein the data in the CIS includes e-mail messages.

114. The computer program product of claim 98 wherein the data in the CIS includes address information.

115. The computer program product of claim 98 wherein the data in the CIS includes calendar and task lists.

116. The computer program product of claim 98 wherein the data in the CIS includes directory lists.

117. The computer program product of claim 98 wherein the data in the CIS includes customer relationship management information.

118. The computer program product of claim 98 wherein the data in the CIS includes sales force automation information.

119. The computer program product of claim 98 wherein the data in the CIS includes field force automation information.

120. The computer program product of claim 98 wherein the data in the CIS includes information related to an organization's employees.

121. The computer program product of claim 120 wherein the data in the CIS includes information from data repositories internal to the organization.

122. The computer program product of claim 120 wherein the data in the CIS includes information from data repositories external to the organization.

123. The computer program product of claim 98 wherein the data in the CIS includes information from databases and web sites on the Internet.

124. The computer program product of claim 98 wherein the speech terminals are configured to allow a user to access and update the data in the CIS through the speech terminals.

125. The computer program product of claim 124 wherein the data in the CIS is accessible to the user and to other users registered in the CIS.

126. The computer program product of claim 98 wherein the server is configured to allow a user to perform tasks using the CIS.

127. The computer program product of claim 126 wherein the tasks include sending and receiving messages.

128. The computer program product of claim 127 wherein the messages are e-mail messages.

129. The computer program product of claim 126 wherein the tasks include forwarding calls.

130. The computer program product of claim 126 wherein the tasks include conferencing with other parties registered in the CIS.

131. The computer program product of claim 98 wherein a set of responses to a user changes dynamically depending on the needs of the user.

132. The computer program product of claim 131 wherein the set of responses to the user includes a recorded message.

133. The computer program product of claim 131 wherein the set of responses to the user is an on-the-fly translation of responses into sounds using text-to-speech technology.

134. The computer program product of claim 98 wherein the speech terminals include multi-modal interfaces.

135. The computer program product of claim 134 wherein the user can input information to the server through the multi-modal interfaces using text, keystrokes, and speech recognition.

136. The computer program product of claim 135 wherein the multi-modal interfaces present information to the server using a combination of sound, text, graphics, and video.

137. The computer program product of claim 136 wherein the sound is generated by text-to-speech technology.

138. The computer program product of claim 136 wherein the sound is generated by playing recorded files.

139. The computer program product of claim 136 wherein the sound is generated by a continuous stream of sound data sent to the multi-modal interfaces.

140. The computer program product of claim 136 wherein the video is generated by a continuous stream of video data sent to the multi-modal interfaces.

141. The computer program product of claim 98 wherein the speech terminals include telephones.

142. The computer program product of claim 98 wherein the speech terminals include personal digital assistants.

143. The computer program product of claim 98 wherein the speech terminals include computers.

144. The mobile communication of claim 1, wherein the logic comprises computer-readable code.

* * * * *